US011891060B2

(12) United States Patent
Kim et al.

(10) Patent No.: US 11,891,060 B2
(45) Date of Patent: Feb. 6, 2024

(54) SYSTEM AND METHOD IN LANE DEPARTURE WARNING WITH FULL NONLINEAR KINEMATICS AND CURVATURE

(71) Applicant: Canoo Technologies Inc., Torrance, CA (US)

(72) Inventors: Kilsoo Kim, Hermosa Beach, CA (US); Jongmoo Choi, Gardena, CA (US); Lei Cao, Torrance, CA (US); Mayukh Sattiraju, Redondo Beach, CA (US); Dheemanth Uppalapati, Marina Del Rey, CA (US); Aviral Singh, Torrance, CA (US)

(73) Assignee: Canoo Technologies Inc., Torrance, CA (US)

( * ) Notice: Subject to any disclaimer, the term of this patent is extended or adjusted under 35 U.S.C. 154(b) by 283 days.

(21) Appl. No.: 17/305,705

(22) Filed: Jul. 13, 2021

(65) Prior Publication Data
US 2023/0013737 A1    Jan. 19, 2023

(51) Int. Cl.
*B60W 30/12* (2020.01)
*B60W 50/14* (2020.01)
(Continued)

(52) U.S. Cl.
CPC ............. *B60W 30/12* (2013.01); *B60K 1/00* (2013.01); *B60W 10/18* (2013.01); *B60W 10/20* (2013.01);
(Continued)

(58) Field of Classification Search
CPC .. B60W 10/18; B60W 10/20; B60W 2420/42; B60W 2520/14;
(Continued)

(56) References Cited

U.S. PATENT DOCUMENTS 6,675,094 B2   1/2004   Russell et al.
9,352,778 B2   5/2016   Yoon et al.
(Continued)

FOREIGN PATENT DOCUMENTS

CN   109740469 A   5/2019
CN   111344646 A   6/2020
(Continued)

OTHER PUBLICATIONS

Bouhoute, Afaf, et al., "On the Application of Machine Learning for Cut-In Maneuver Recognition in Platooning Scenarios", 2020 IEEE 91st Vehicular Technology Conference (VTC2020-Spring), 2020, 5 pages.
(Continued)

*Primary Examiner* — Babar Sarwar (57) ABSTRACT

An apparatus includes at least one camera configured to capture an image of a traffic lane in front of a vehicle. The apparatus also includes a vehicle behavior prediction controller configured to determine lane boundaries and road curvature for a segment of a traffic lane occupied by the vehicle from the captured image and prior captured images; determine lateral distances of the vehicle from the lane boundaries and a rate of departure of the vehicle from the occupied traffic lane that is accurate for the determined road curvature; determine a time to line crossing for the vehicle from the lateral distances and the rate of departure; and activate a lane departure warning indicator based on the determined time to line crossing.

20 Claims, 9 Drawing Sheets (51) Int. Cl.
| | |
|---|---|
| *B60W 10/18* | (2012.01) |
| *B60W 10/20* | (2006.01) |
| *B60K 1/00* | (2006.01) |
| *G08G 1/16* | (2006.01) |
| *G06V 10/44* | (2022.01) |
| *G06V 20/56* | (2022.01) |

(52) U.S. Cl.
CPC ............ *B60W 50/14* (2013.01); *G06V 10/44* (2022.01); *G06V 20/588* (2022.01); *G08G 1/167* (2013.01); *B60W 2420/42* (2013.01); *B60W 2520/14* (2013.01); *B60W 2552/30* (2020.02); *B60W 2552/53* (2020.02); *B60W 2710/18* (2013.01); *B60W 2710/20* (2013.01)

(58) Field of Classification Search
CPC ....... B60W 2050/143; B60W 2420/52; B60W 2520/06; B60W 2520/10; B60W 2520/105; B60W 2520/28; B60W 2552/30; B60W 2552/53; B60W 2554/801; B60W 2710/18; B60W 2710/20; B60W 30/045; B60W 30/12; B60W 50/14; B60K 1/00; G01P 15/08; G06V 10/44; G06V 20/588; G08G 1/167
See application file for complete search history.

(56) References Cited

U.S. PATENT DOCUMENTS

| | | | |
|---|---|---|---|
| 9,595,197 | B2 | 3/2017 | Lee |
| 10,227,039 | B1 | 3/2019 | Prasad |
| 11,104,336 | B2 | 8/2021 | Lin et al. |
| 11,237,562 | B2 | 2/2022 | Schultz et al. |
| 11,260,757 | B2 | 3/2022 | Degand et al. |
| 11,328,593 | B2 | 5/2022 | Urano et al. |
| 11,535,274 | B2 | 12/2022 | Dingli et al. |
| 2003/0229438 | A1 | 12/2003 | Hac |
| 2004/0164851 | A1 | 8/2004 | Crawshaw |
| 2008/0071451 | A1 | 3/2008 | Yamaguchi et al. |
| 2009/0021358 | A1 | 1/2009 | Lee et al. |
| 2009/0030613 | A1 | 1/2009 | Kataoka et al. |
| 2009/0037062 | A1 | 2/2009 | Lee et al. |
| 2009/0157263 | A1 | 6/2009 | Shin |
| 2009/0284360 | A1 | 11/2009 | Litkouhi |
| 2010/0172542 | A1 | 7/2010 | Stein et al. |
| 2010/0182139 | A1* | 7/2010 | Chen ................ B62D 15/029 340/576 |
| 2012/0022739 | A1 | 1/2012 | Zeng |
| 2012/0050074 | A1* | 3/2012 | Bechtel ................ G06V 10/147 382/104 |
| 2013/0190982 | A1 | 7/2013 | Nakano et al. |
| 2013/0190985 | A1 | 7/2013 | Nakano et al. |
| 2013/0261898 | A1 | 10/2013 | Fujita et al. |
| 2013/0321172 | A1* | 12/2013 | Igarashi ................ G08G 1/166 340/905 |
| 2013/0335213 | A1* | 12/2013 | Sherony ................ G08G 1/167 340/439 |
| 2013/0345900 | A1* | 12/2013 | Usui ................ B60W 10/20 701/1 |
| 2014/0002655 | A1* | 1/2014 | Woo ................ G08G 1/167 348/148 |
| 2014/0236428 | A1 | 8/2014 | Akiyama |
| 2015/0149037 | A1* | 5/2015 | Lim ................ B60W 30/18163 701/41 |
| 2015/0314783 | A1 | 11/2015 | Nespolo et al. |
| 2017/0010618 | A1 | 1/2017 | Shashua et al. |
| 2017/0313253 | A1 | 11/2017 | Hughes et al. |
| 2018/0024238 | A1 | 1/2018 | Khlifi |
| 2018/0024562 | A1 | 1/2018 | Bellaiche |
| 2018/0025235 | A1 | 1/2018 | Fridman |
| 2018/0141528 | A1 | 5/2018 | Oh et al. |
| 2018/0150700 | A1 | 5/2018 | Kaneko et al. |
| 2018/0186378 | A1 | 7/2018 | Zhuang et al. |
| 2018/0237007 | A1 | 8/2018 | Adam et al. |
| 2018/0307236 | A1 | 10/2018 | Reed |
| 2019/0072973 | A1 | 3/2019 | Sun et al. |
| 2019/0202453 | A1 | 7/2019 | Farooqi et al. |
| 2019/0283748 | A1 | 9/2019 | Hajika et al. |
| 2019/0384294 | A1 | 12/2019 | Shashua et al. |
| 2019/0389470 | A1 | 12/2019 | Zarringhalam et al. |
| 2020/0079372 | A1 | 3/2020 | Hajika |
| 2020/0272835 | A1 | 8/2020 | Cheng et al. |
| 2020/0339079 | A1 | 10/2020 | Ohmura |
| 2020/0377088 | A1 | 12/2020 | Fukushige et al. |
| 2020/0379461 | A1 | 12/2020 | Singh et al. |
| 2021/0171042 | A1 | 6/2021 | Hayakawa et al. |
| 2021/0197858 | A1 | 7/2021 | Zhang et al. |
| 2021/0221364 | A1 | 7/2021 | Mase et al. |
| 2021/0229708 | A1 | 7/2021 | Kondo et al. |
| 2021/0366144 | A1 | 11/2021 | Magistri et al. |
| 2022/0082403 | A1 | 3/2022 | Shapira et al. |
| 2022/0089219 | A1 | 3/2022 | Takebayashi et al. |
| 2022/0097697 | A1 | 3/2022 | Wang et al. |
| 2022/0212670 | A1 | 7/2022 | Aoki et al. |
| 2022/0266852 | A1 | 8/2022 | Khayyer |
| 2022/0363250 | A1 | 11/2022 | Varunjikar et al. |

FOREIGN PATENT DOCUMENTS

| | | |
|---|---|---|
| CN | 109740469 B | 1/2021 |
| DE | 10333670 B4 | 7/2019 |
| EP | 3342666 A1 | 7/2018 |
| EP | 3805073 A1 | 4/2021 |
| GB | 2550256 A | 11/2017 |
| IN | 202014005110 A | 8/2020 |
| JP | 2009-020854 A | 1/2009 |
| JP | 5187171 B2 | 4/2013 |
| JP | 2018-203173 A | 12/2018 |
| JP | 2021-503414 A | 2/2021 |
| WO | 2019099622 A1 | 5/2019 |

OTHER PUBLICATIONS

Heinemann, Tonja, "Predicting Cut-Ins in Traffic Using a Neural Network", Masters thesis in Systems, Control and Mechatronics, Chalmers University of Technology, Department of Electrical Engineering, Gothenburg, Sweden, 2017, 62 pages.

Bar Hillel, Aharon, et al., "Recent Progress in Road and Lane Detection: A Survery", Machine Vision and Applications, Apr. 2014, 20 pages.

Morris, Brendan, et al., "Lane Change Intent Prediction for Driver Assistance: On-Road Design and Evaluation", 2011 IEEE Intelligent Vehicles Symposium (IV), Baden-Baden, Germany, Jun. 5-9, 2011, 8 pages.

Narote, S.P., et al., "A Review of Recent Advances in Lane Detection and Departure Warning System", Pattern Recognition, vol. 73, Jan. 2018, 50 pages.

Non-final Office Action dated Jan. 18, 2023, in connection with U.S. Appl. No. 17/305,701, 9 pages.

Final Office Action dated Feb. 23, 2023, in connection with U.S. Appl. No. 17/305,702, 10 pages.

Non-final Office Action dated Mar. 28, 2023, in connection with U.S. Appl. No. 17/305,704, 14 pages.

Non-final Office Action dated Mar. 30, 2023, in connection with U.S. Appl. No. 17/305,706, 12 pages.

Non-final Office Action dated Apr. 25, 2023, in connection with U.S. Appl. No. 17/305,703, 17 pages.

Non-final Office Action dated Sep. 29, 2022, in connection with U.S. Appl. No. 17/305,702, 13 pages.

International Search Report and Written Opinion of the International Search Authority dated Sep. 30, 2022, in connection with International Application No. PCT/US2022/037008, 7 pages.

International Search Report and Written Opinion of the International Search Authority dated Nov. 16, 2022, in connection with International Application No. PCT/US2022/037000, 8 pages.

International Search Report and Written Opinion of the International Search Authority dated Nov. 15, 2022, in connection with International Application No. PCT/US2022/037011, 8 pages.

(56) References Cited

OTHER PUBLICATIONS

International Search Report and Written Opinion of the International Search Authority dated Nov. 18, 2022, in connection with International Application No. PCT/US2022/037013, 9 pages.
International Search Report and Written Opinion of the International Search Authority dated Nov. 18, 2022, in connection with International Application No. PCT/US2022/037015, 8 pages.
International Search Report and Written Opinion of the International Search Authority dated Nov. 15, 2022, in connection with International Application No. PCT/US2022/037016, 9 pages.
Baek, et al., "Practical Approach for Developing Lateral Motion Control of Autonomous Lane Change System," Applied Sciences 2020, 10, 3143, Apr. 2020, 15 pages.
Lian et al. "Cornering Stiffness and Sideslip Angle Estimation Based on Simplified Lateral Dynamic Models for Four-In-Wheel-Motor-Driven Electric Vehicles with Lateral Tire Force Information," International Journal of Automotive Technology, vol. 16, No. 4, 2015, 15 pages.
Pereira, et al., "Cornering stiffness estimation using Levenberg-Marquardt approach," Inverse Problems in Science and Engineering, vol. 29, 2021—Issue 12, May 2021, 55 pages.
Sierra et al., "Cornering stiffness estimation based on vehicle later dynamics," Vehicle System Dynamics, vol. 44, Supplement, 2006, 15 pages.
Weon, et al., "Lane Departure Detecting with Classification of Roadway Based on Bezier Curve Fitting Using DGPS/GIS," Technical Gazette 28 1(2021), Feb. 2021, 8 pages.
Final Office Action dated Jun. 23, 2023, in connection with U.S. Appl. No. 17/305,701, 13 pages.
Notice of Allowance dated Jun. 29, 2023, in connection with U.S. Appl. No. 17/305,702, 9 pages.
Non-final Office Action dated Aug. 24, 2023, in connection with U.S. Appl. No. 17/305,701, 12 pages.
Notice of Allowance dated Aug. 7, 2023, in connection with U.S. Appl. No. 17/305,706, 6 pages.
Notice of Allowance dated Aug. 3, 2023, in connection with U.S. Appl. No. 17/305,702, 8 pages.
Final Office Action dated Sep. 8, 2023, in connection with U.S. Appl. No. 17/305,704, 15 pages.
Notice of Allowance dated Oct. 18, 2023, in connection with U.S. Appl. No. 17/305,703, 11 pages.

* cited by examiner

SYSTEM AND METHOD IN LANE DEPARTURE WARNING WITH FULL NONLINEAR KINEMATICS AND CURVATURE

CROSS-REFERENCE TO RELATED APPLICATIONS

This application is related to the subject matter of: U.S. patent application Ser. No. 17/305,701 filed Jun. 30, 2021 and entitled SYSTEM AND METHOD IN THE PREDICTION OF TARGET VEHICLE BEHAVIOR BASED ON IMAGE FRAME AND NORMALIZATION; U.S. patent application Ser. No. 17/305,702 filed Jul. 13, 2021 and entitled SYSTEM AND METHOD IN DATA-DRIVEN VEHICLE DYNAMIC MODELING FOR PATH-PLANNING AND CONTROL; U.S. patent application Ser. No. 17/305,703 filed Jul. 13, 2021 and entitled SYSTEM AND METHODS OF INTEGRATING VEHICLE KINEMATICS AND DYNAMICS FOR LATERAL CONTROL FEATURE AT AUTONOMOUS DRIVING; U.S. patent application Ser. No. 17/305,704 filed Jul. 13, 2021 and entitled SYSTEM AND METHOD IN VEHICLE PATH PREDICTION BASED ON FULL NONLINEAR KINEMATICS; U.S. patent application Ser. No. 17/305,706 filed Jul. 13, 2021 and entitled SYSTEM AND METHOD FOR LANE DEPARTURE WARNING WITH EGO MOTION AND VISION. The content of the above-identified patent documents is incorporated herein by reference.

TECHNICAL FIELD

This disclosure relates generally to vehicle driver assist or autonomous driving systems. More specifically, this disclosure relates to lane departure warning.

BACKGROUND

Advanced driving assist system (ADAS) features, which use automated technology to assist the vehicle operator in driving and parking, form a foundation for autonomous driving (AD). Determination of vehicle position information and/or detection of nearby objects enables features such as: collision detection and avoidance for adaptive cruise control (ACC), emergency braking; blind spot detection for collision warning and/or evasive steering; lane detection for lane keeping and/or centering, lane changing, or lane departure warning; and path planning and control. Other ADAS and AD features may also be implemented using the same sensor set(s).

Electric vehicles (EVs) are often capable of higher driving and handling performance relative to conventional vehicles. EV designs can include low centers of gravity, independent steering, and immediate, quick, and smooth acceleration. As a result, ADAS and AD features for EVs can involve different considerations than those for conventional vehicles.

SUMMARY

Vehicle lane departure prediction for warning and/or collision avoidance, within the vehicle's ADAS or AD features, is improved in ways suitable to EVs having higher driving and handling performance. The vehicle rate of departure from an occupied lane is determined even for road segments having a small radius of curvature. The improved lane departure warning helps predict and warn of lane departure even during high performance maneuvers so that vehicle planning and control may optionally take control of at least vehicle steering and/or braking for a corrective action.

In one embodiment, an apparatus includes at least one camera configured to capture an image of a traffic lane in front of a vehicle. The apparatus also includes a vehicle behavior prediction controller configured to determine lane boundaries and road curvature for a segment of a traffic lane occupied by the vehicle from the captured image and prior captured images; determine lateral distances of the vehicle from the lane boundaries and a rate of departure of the vehicle from the occupied traffic lane that is accurate for the determined road curvature; determine a time to line crossing for the vehicle from the lateral distances and the rate of departure; and activate a lane departure warning indicator based on the determined time to line crossing.

The rate of departure may be determined using first and second terms for effect of road curvature on lane departure for different radii of curvature. The rate of departure $V_{depart}$ may be determined from:

$$V_{depart} = v \cdot \sin(\theta) + c_l \dot{\theta},$$

where v is a speed of the vehicle, $\theta$ is a heading offset for the vehicle, $\dot{\theta}$ is a first derivative of $\theta$ with respect to traveled distance, $c_l$ is a length of the vehicle, $v \cdot \sin(\theta)$ represents effect of road curvature on lane departure for a first range of radii of curvature, and $c_l \dot{\theta}$ represents effect of road curvature on lane departure for a second range of radii of curvature. $\dot{\theta}$ may be determined from:

$$\dot{\theta} = \omega - \frac{v\kappa\cos(\theta)}{1 - \kappa r},$$

where $\omega$ is vehicle yaw rate, $\kappa$ is the road curvature, and r is a lateral offset of the vehicle to a lane boundary. The lane departure warning indicator may be activated based on the lateral distances, the rate of departure, and a curvature of the road. The lane departure warning indicator may be activated based on:

$$LDW = \text{function}(D_{threshold}, V_{threshold}, \kappa_{threshold}),$$

where $D_{threshold}$ is a threshold for distance of the vehicle from a lane boundary being approached, $V_{threshold}$ is a threshold for vehicle speed, and $\kappa_{threshold}$ is a threshold for road curvature. A time to line crossing TTLC may be determined from a lateral distance $d_L$ to a left lane boundary, a lateral distance d R to a right lane boundary, and the rate of departure $V_{depart}$ based on:

$$\text{if } d_L < d_R, TTLC = \frac{d_L}{V_{depart}},$$

$$\text{else } d_L > d_R, TTLC = \frac{d_R}{V_{depart}}.$$

The apparatus may also include a vehicle motion controller configured to activate at least one of a braking control and a steering control based on the lane departure warning indicator.

In another embodiment, a vehicle includes the apparatus and a motor configured to drive wheels of the vehicle. The vehicle also includes a chassis supporting axles on which the wheels are mounted and a steering control configured to generate a steering command to control the wheels based on activation of the lane departure warning indicator. The vehicle further includes a brake actuator configured to actuate brakes for one or more of the wheels and a braking control configured to generate a braking command to control the brake actuator based on activation of the lane departure warning indicator. The vehicle may be an electric vehicle.

In still another embodiment, a method includes capturing an image of a traffic lane in front of a vehicle, determining lane boundaries and road curvature for a segment of a traffic lane occupied by the vehicle from the captured image and prior captured images, determining lateral distances of the vehicle from the lane boundaries and a rate of departure of the vehicle from the occupied traffic lane that is accurate for the determined road curvature, determining a time to line crossing for the vehicle from the lateral distances and the rate of departure, and activating a lane departure warning indicator based on the determined time to line crossing.

The method may further include determining the rate of departure using first and second terms for effect of road curvature on lane departure for different radii of curvature. The rate of departure $V_{depart}$ may be determined from:

$$V_{depart} = v \cdot \sin(\theta) + c_l \cdot \dot{\theta},$$

where v is a speed of the vehicle, $\theta$ is a heading offset for the vehicle, $\dot{\theta}$ is a first derivative of $\theta$ with respect to traveled distance, $c_l$ is a length of the vehicle, $v \cdot \sin(\theta)$ represents effect of road curvature on lane departure for a first range of radii of curvature, and $c_l \cdot \dot{\theta}$ represents effect of road curvature on lane departure for a second range of radii of curvature. $\dot{\theta}$ may be determined from:

$$\dot{\theta} = \omega - \frac{v\kappa\cos(\theta)}{1 - \kappa r},$$

where $\omega$ is vehicle yaw rate, $\kappa$ is the road curvature, and r is a lateral offset of the vehicle to a lane boundary. The lane departure warning indicator may be activated based on the lateral distances, the rate of departure, and a curvature of the road. The lane departure warning indicator may be activated based on:

$$LDW = \text{function}(D_{threshold}, V_{threshold}, \kappa_{threshold}),$$

where $D_{threshold}$ is a threshold for distance of the vehicle from a lane boundary being approached, $V_{threshold}$ is a threshold for vehicle speed, and $\kappa_{threshold}$ is a threshold for road curvature. The time to line crossing TTLC may be determined from a lateral distance $d_L$ to a left lane boundary, a lateral distance $d_R$ to a right lane boundary, and the rate of departure $V_{depart}$ based on:

$$\text{if } d_L < d_R, TTLC = \frac{d_L}{V_{depart}},$$

$$\text{else } d_L > d_R, TTLC = \frac{d_R}{V_{depart}}.$$

The method may also include controlling a vehicle motion by activating at least one of a braking control and a steering control based on the lane departure warning indicator.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 7, described below, and the various embodiments used to describe the principles of this disclosure are by way of illustration only and should not be construed in any way to limit the scope of this disclosure. Those skilled in the art will understand that the principles of this disclosure may be implemented in any type of suitably arranged device or system.

In ADAS, there are lateral warning features alarming a human driver (or "operator"). One such lateral warning feature is a lane departure warning (LDW), which warns the driver when the subject vehicle starts to drift toward or over a traffic lane boundary. However, LDW is often very limited due to only being activated when the perception of a lane is available, which may not be the case for a road with a high curvature (small radius of curvature, e.g., less than about 250 meters). As a result, current LDW only covers road segments with a limited radius of curvature and/or vehicle speed. In addition, limited vision information of lateral offset and heading offset may be available for use for LDW. LDW according to the present disclosure uses full nonlinear kinematics with full vision information of lateral offset, heading offset, curvature, and rate of curvature. Among other things, this allows LDW according to the present disclosure to cope with road segments having a small radius of curvature.

Figure 1:
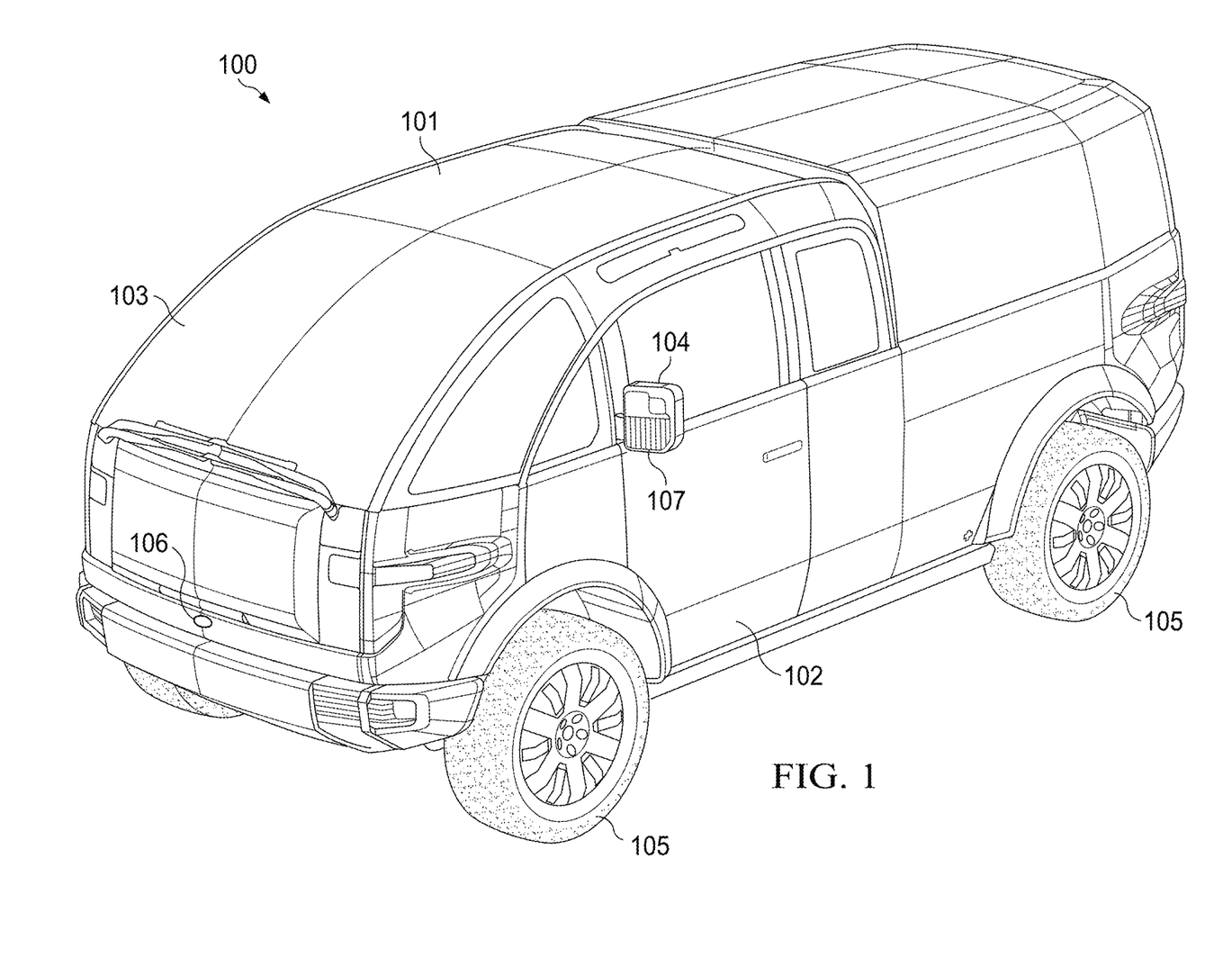
FIG. 1 is a perspective view of a vehicle within which improved lane departure warning is implemented in accordance with embodiments of the present disclosure.

FIG. 1 is a perspective view of a vehicle 100 within which improved lane departure warning is implemented in accordance with embodiments of the present disclosure. The embodiment of the vehicle 100 illustrated in FIG. 1 is for illustration and explanation only. FIG. 1 does not limit the scope of this disclosure to any particular implementation of a vehicle.

The vehicle 100 of FIG. 1 includes a chassis (not visible in FIG. 1) supporting a cabin 101 for carrying passengers. In some embodiments, the vehicle 100 is an EV in which the chassis is in the form of a "skateboard" vehicle platform supporting one or more energy storage elements (e.g., batteries) that provide input electrical power used by various components of the EV, such as one or more electric motors of the vehicle 100 and a control system of the electric vehicle described in further detail below.

Passengers may enter and exit the cabin 101 through at least one door 102 forming part of the cabin 101. A transparent windshield 103 and other transparent panels mounted within and forming part of the cabin 101 allow at least one passenger (referred to as the "operator," even when the vehicle 100 is operating in an AD mode) to see outside the cabin 101. Rear view mirrors 104 mounted to sides of the cabin 101 enable the operator to see objects to the sides and rear of the cabin 101 and may include warning indicators (e.g., selectively illuminated warning lights) for ADAS features such as blind spot warning (indicating that another vehicle is in the operator's blind spot) and/or lane departure warning.

Wheels 105 mounted on axles that are supported by the chassis and driven by the motor(s) (all not visible in FIG. 1) allow the vehicle 100 to move smoothly. The wheels 105 are mounted on the axles in a manner permitting rotation relative to a longitudinal centerline of the vehicle 100 for steering and are also connected to steering controls (not visible). Conventional automobile features such as headlamps, taillights, turn signal indicators, windshield wipers, and bumpers are also depicted. The vehicle 100 may further include cargo storage within or connected to the cabin 101 and mounted on the chassis, with the cargo storage area(s) optionally partitioned by dividers from the passenger area(s) of the cabin 101.

In the present disclosure, the vehicle 100 includes a vision system including at least a front camera 106, side cameras 107 (mounted on the bottoms of the rear view mirrors 104 in the example depicted), and a rear camera. The cameras 106, 107 provide images to the vehicle control system for use as part of ADAS and AD features as described below, and the images may optionally be displayed to the operator.

Although FIG. 1 illustrates one example of a vehicle 100, those skilled in the art will recognize that the full structure and operation of a suitable vehicle are not depicted in the drawings or described here. Instead, for simplicity and clarity, only the structure and operation necessary for an understanding the present disclosure is depicted and described. Various changes may be made to the example of FIG. 1, and the improved lane departure warning described in this disclosure may be used with any other suitable vehicle.

Figure 2:
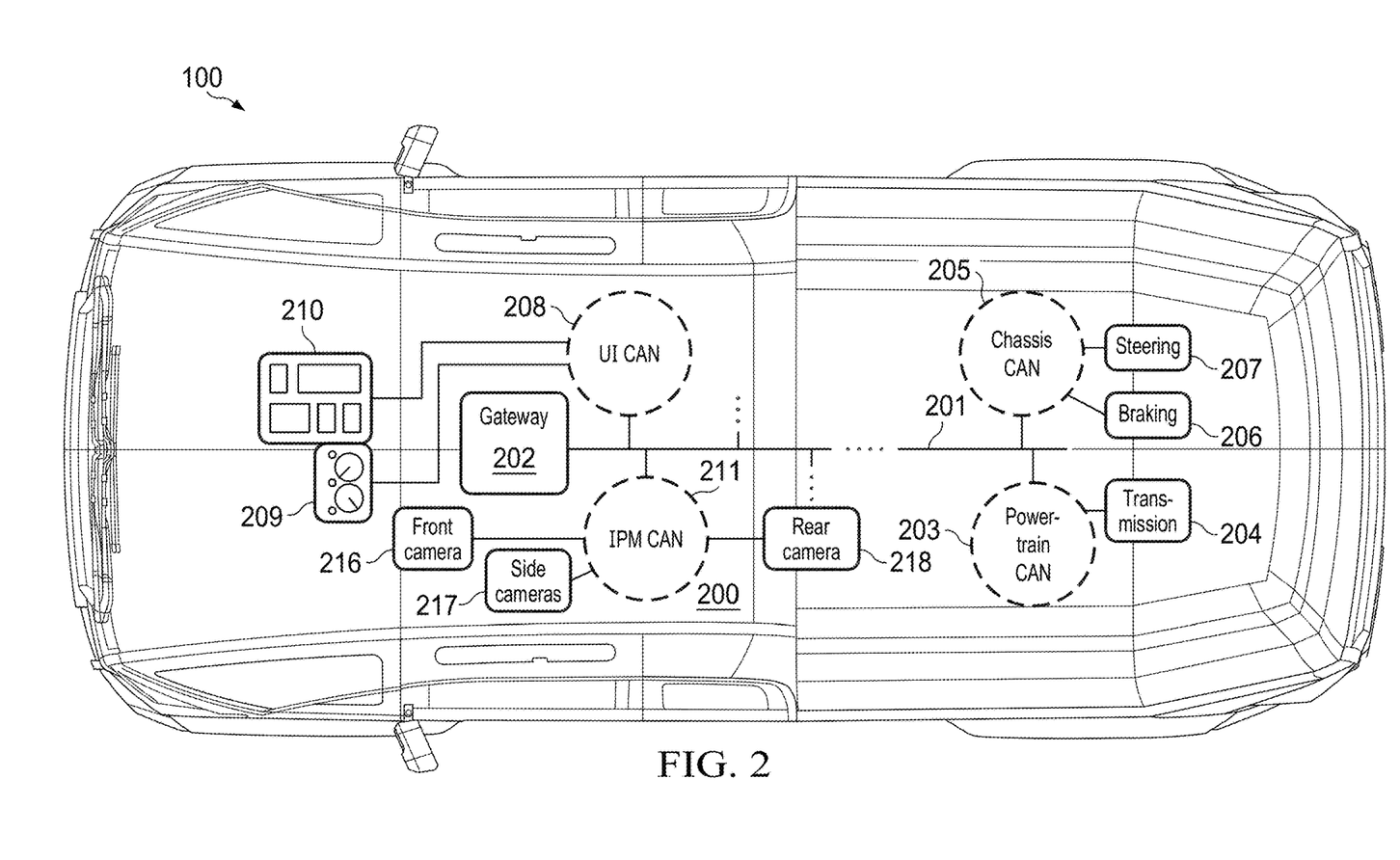
FIGS. 2 and 2A depict a vehicle control system for a vehicle within which improved lane departure warning is implemented in accordance with embodiments of the present disclosure.
Figure 2A:
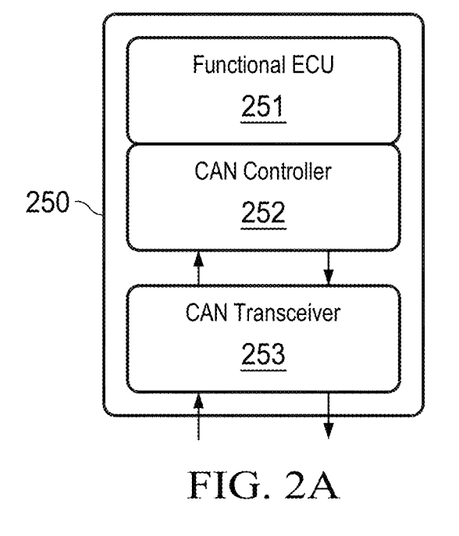

FIGS. 2 and 2A depict a vehicle control system 200 for a vehicle within which improved lane departure warning are implemented in accordance with embodiments of the present disclosure. The embodiment of the vehicle control system 200 illustrated in FIGS. 2 and 2A is for illustration and explanation only. FIGS. 2 and 2A do not limit the scope of this disclosure to any particular implementation of a vehicle control system.

FIG. 2 depicts a modern vehicle control system 200 utilizing various electronic control units (ECUs) interconnected on a controller area network (CAN) via the so-called CAN bus. The standard for the CAN bus was released around 1993 by the International Organization for Standardization (ISO) as ISO 11898. The current version of that standard is ISO 11898-1:2015, and the CAN busses described herein may comply with that standard in some embodiments. Each ECU typically includes a printed circuit board (PCB) with a processor or microcontroller integrated circuit coupled to various input sensors, switches, relays, and other output devices. The CAN design permits the ECUs to communicate with each other without the need for a centralized host. Instead, communication takes place on a peer-to-peer basis. The CAN design therefore permits data from sensors and other ECUs to circulate around the vehicle ECUs, with each ECU transmitting sensor and programming information on the CAN bus while simultaneously listening to the CAN bus to pull out data needed to complete tasks being performed by that ECU. There is no central hub or routing system, just a continuous flow of information available to all the ECUs.

By way of example, power doors on a vehicle may be operated by an ECU called the body control module (not shown in FIG. 2). Sensors constantly report whether the doors are open or closed. When the driver pushes a button to close a door, the signal from that switch is broadcast across the CAN bus. When the body control module ECU detects that signal, however, the body control module ECU does not simply close the door. Instead, the body control module ECU first checks the data stream to make sure the vehicle is in park and not moving and, if all is well, gives a command to a power circuit that energizes the motors used to close the door. The body control module ECU may go even further, such as by monitoring the voltage consumed by the motors. If the body control module ECU detects a voltage spike, which happens when a door is hindered by an errant handbag or a wayward body part, the ECU immediately reverses the direction of the door to prevent potential injury. If the door closes properly, the latch electrically locks the door shut, which is an event that may be detected by the body control module ECU.

Notably, vehicle control systems are migrating to higher-speed networks with an Ethernet-like bus for which each ECU is assigned an Internet protocol (IP) address. Among other things, this may allow both centralized vehicle ECUs and remote computers to pass around huge amounts of information and participate in the Internet of Things (IoT).

In the example shown in FIG. 2, the vehicle control system 200 includes a CAN bus 201 embodied or controlled by a gateway ECU 202, which facilitates messages on and among CANs, transmitted and detected by ECUs. FIG. 2 illustrates a powertrain CAN 203 to which a transmission ECU 204 is connected and a chassis CAN 205 to which a braking ECU 206 and a steering (e.g., steering angle) ECU 207 are connected. The braking ECU 206 is connected to brake actuator(s) (not shown) for emergency and normal braking, while the steering ECU 207 is connected to a steering drive motor for evasive and normal steering. The vehicle control system 200 in FIG. 2 also includes a user interface (UI) CAN 208 to which a "dashboard" ECU 209 and a touchscreen ECU 210 are connected. The ECUs 209 and 201 may be integrated with the respective dashboard controls and touchscreen. The UI CAN 208 and the associated dashboard ECU 209 and touchscreen 210 allow the operator to set operating parameters such as following distance for ACC, enable or disable ADAS indicators such as blind spot detection or collision warning, and the like. The dashboard ECU 209 may be connected to sensors and indicators other than those on the dashboard, such as the rear view mirror blind spot indicators described above. The ADAS indicators may include illuminated indicators on any combination of the dashboard and the rear view mirrors and/or in a heads-up display projected onto the windshield 103; audio warnings sounded on the vehicle's audio system speakers; and/or haptic indicators such as a vibrator within the vehicle operator's seat.

For the present disclosure, the vehicle control system 200 includes an image processing module (IPM) CAN 211 to which the front camera ECU 216, side camera ECU 217, and rear camera ECU 218 are connected. The front camera ECU 216 receives image data from the front camera 106 on the vehicle 100, while the side camera ECU 217 receives image data from each of the side cameras 107 and the rear camera ECU 218 receives image data from the rear camera. In some embodiments, a separate ECU may be used for each camera, such that two side camera ECUs may be employed. The IPM CAN 211 and the front camera ECU 216, side camera ECU 217, and rear camera ECU 218 process image data for use in vision-based ADAS features, such as providing a rear back-up camera display and/or stitching together the images to create a "bird's eye" view of the vehicle's surroundings.

FIG. 2A illustrates a high level block diagram for the architecture 250 of each CAN depicted in FIG. 2. Each CAN shown in FIG. 2, including the chassis CAN 205, IPM CAN 211, and radar CAN 220, includes a functional ECU 251 for the specific function performed by the respective CAN (e.g., at least steering and braking in the case of the chassis CAN 205, and image processing in the case of the IPM CAN 211). The functional ECU 251 is coupled to a CAN controller 252 that controls the interactions of the respective CAN with the other CANs within the vehicle 100 through the gateway ECU 202. A CAN transceiver 253 receives messages from and transmit messages to other CANs under the control of the CAN controller 252.

Although FIGS. 2 and 2A illustrate one example of a vehicle control system 200, those skilled in the art will recognize that the full structure and operation of a suitable vehicle control system is not depicted in the drawings or described here. Instead, for simplicity and clarity, only the structure and operation necessary for an understanding of the present disclosure is depicted and described. Various changes may be made to the example of FIGS. 2 and 2A, and the improved lane departure warning described in this disclosure may be used with any other suitable vehicle control system.

To support various ADAS functions such as lane departure warning and collision avoidance during high performance operation or at other times, the IPM CAN 211 for the vehicle 100 can accurately detect a lane boundary even for a road segment with a small radius of curvature.

Figure 3:
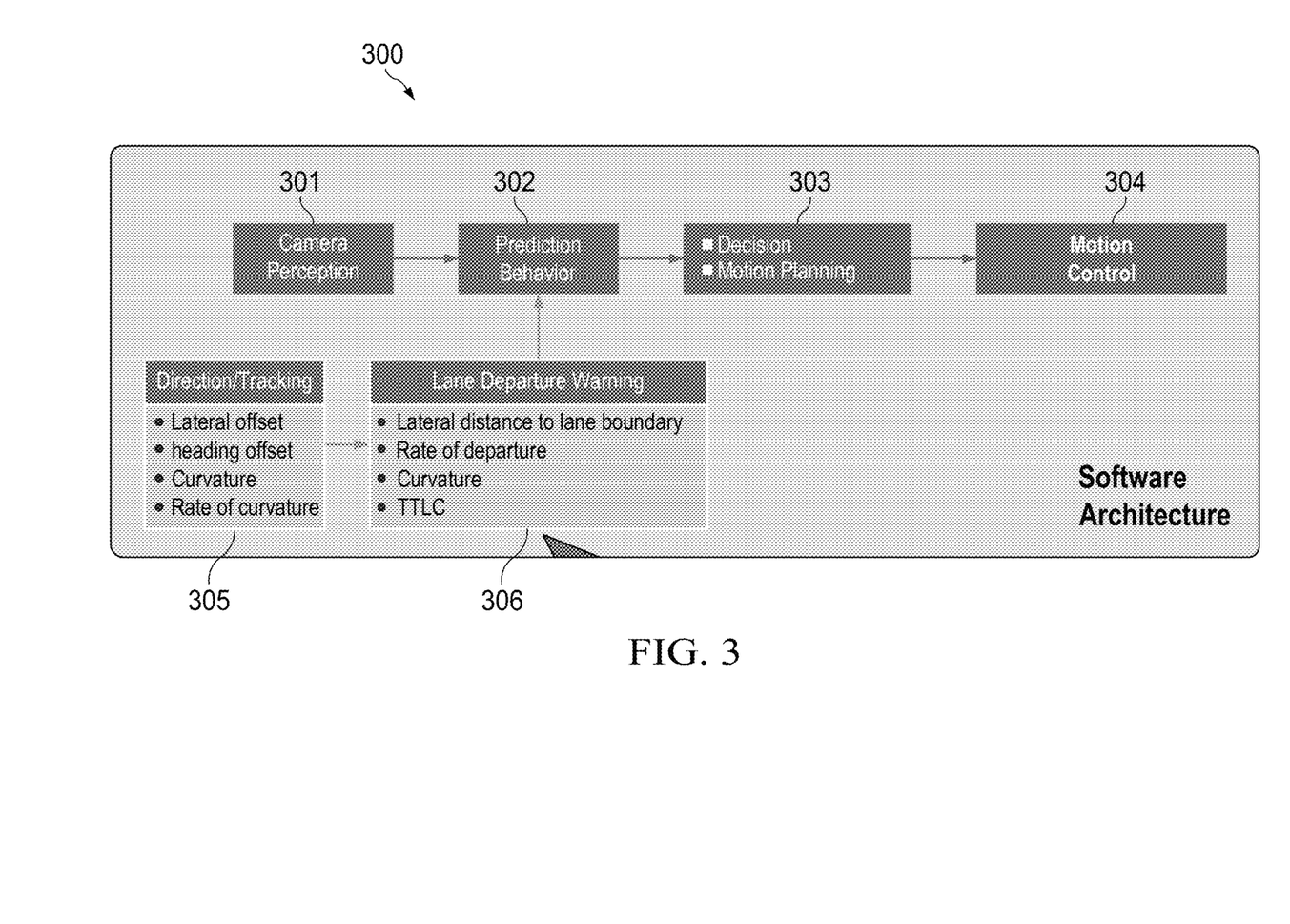
FIG. 3 illustrates a functional diagram of a system within a vehicle for performing improved lane departure warning in accordance with embodiments of the present disclosure.

FIG. 3 illustrates a functional diagram of a system 300 within a vehicle for performing improved lane departure warning in accordance with embodiments of the present disclosure. The embodiment of the system 300 illustrated in FIG. 3 is for illustration and explanation only. FIG. 3 does not limit the scope of this disclosure to any particular implementation. In some embodiments, the system 300 in FIG. 3 may be implemented by, or in connection with, the chassis CAN 205, braking ECU 206, and steering ECU 207 in FIG. 2, including the functional (CAN) ECU 251, CAN processor/controller 252, and CAN transceiver 253 depicted in FIG. 2A for the chassis CAN 205. Lane detection for the system 300 in FIG. 3 may be implemented using, or by connection to, the front camera 106 and the side cameras 107 in FIG. 1 and the IPM CAN 211, front camera ECU 216, side camera ECU(s) 217, and rear camera ECU 218 in FIG. 2, including the functional (CAN) ECU 251, CAN processor/controller 252, and CAN transceiver 253 depicted in FIG. 2A for the IPM CAN 211. Specific functions depicted in FIG. 3 may be distributed among those components.

To support ADAS and AD features, the system 300 includes the functions of camera perception 301, vehicle behavior prediction 302, decision and motion planning 303, and motion control 304. Camera perception 301 detects a traffic lane ahead and the relative position of the vehicle within that lane. Vehicle behavior prediction 302 determines whether the vehicle could potentially cross or is crossing a lane boundary, risking collision with another vehicle in an adjacent lane. Decision and motion planning 303 and motion control 304 respectively determine and, if necessary, implement reactive responses to the vehicle's possible lane departure, such as activation of an indicator or steering assistance and/or emergency braking.

Camera perception 301 determines, from captured images using any suitable techniques, detection/tracking parameters 305 including lateral offset of the vehicle from a reference path (e.g., the lane centerline), a heading offset from the lane direction, curvature of the lane, and a rate of curvature of the lane. Detection/tracking parameters 305 are used by behavior prediction 302 to determine lane departure warning parameters 306, which include lateral distance of the vehicle to a lane boundary, rate of departure of the vehicle from the lane, curvature of the vehicle's predicted path, and time to line crossing (TTLC).

Figure 4:
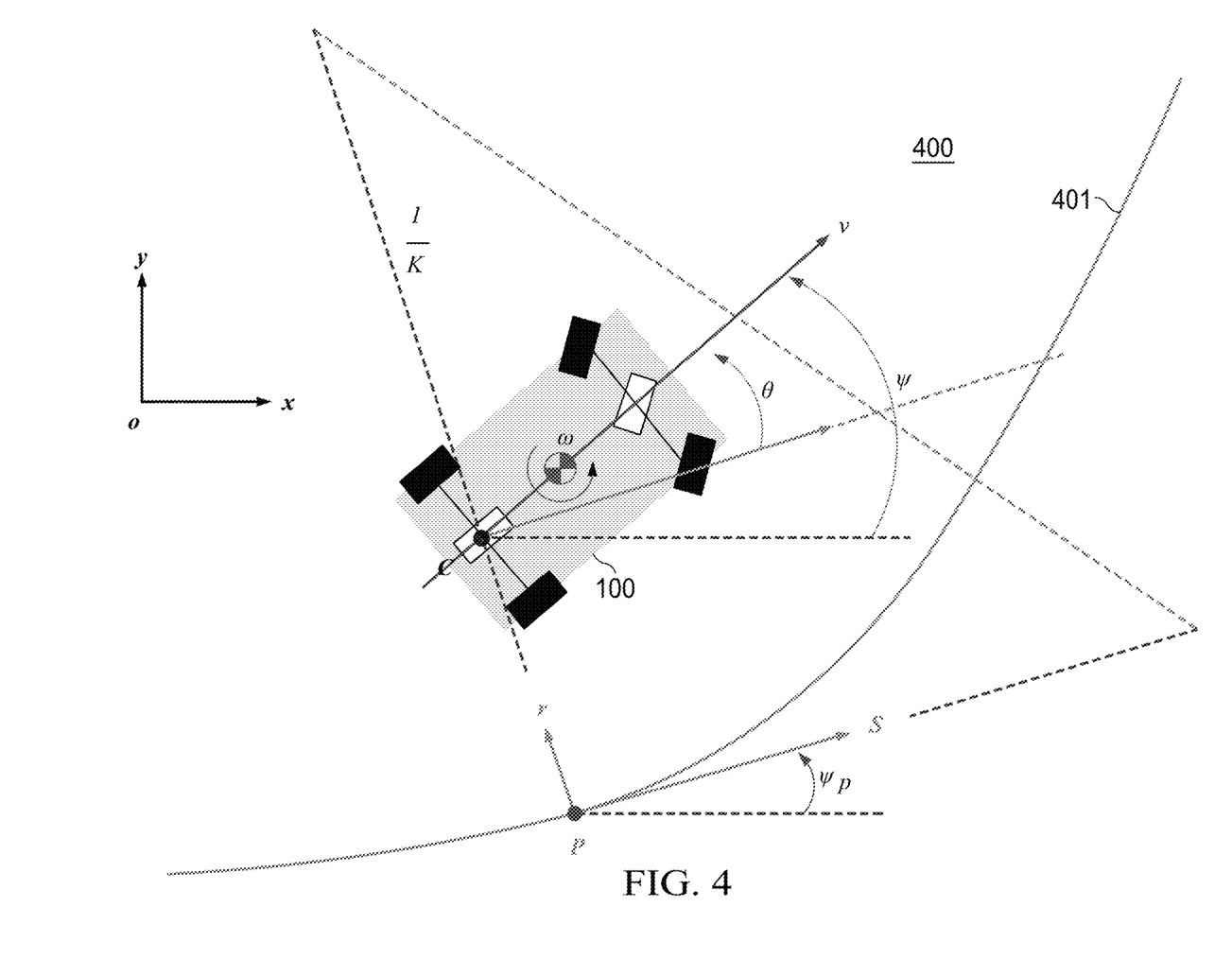
FIG. 4 illustrates a scenario for lane departure warning in accordance with embodiments of the present disclosure.

FIG. 4 illustrates a scenario for lane departure warning in accordance with embodiments of the present disclosure. For purposes of lane departure warning, the kinematics of the vehicle 100 may be described relative to the reference path (e.g., the lane centerline) along a lane 400 having a lane boundary 401 by projecting a reference point onto the reference path and introducing a Frenet coordinate frame (P, s, r) at the projection point P. Various types of projection techniques may be used here. For example, an orthogonal projection defines the projection point P such that the connecting line between reference point C (e.g., the center of the vehicle's rear axle) and P is orthogonal to the tangent to the path in P. As another example, a parallel projection defines the projection point P by the intersection of the reference path with the y-axis of the vehicle coordinate frame. While the parallel projection may be easier to compute, the orthogonal projection may have certain advantages. For instance, since the orthogonal projection is invariant to vehicle rotation, the projection point monotonically travels along the path as long as the vehicle velocity is positive. Therefore, orthogonal projection is used in the following, although other projection techniques may be used.

The vehicle 100 travels exactly along the reference path if the reference point lies on the reference path and the velocity vector is tangent to the path. Therefore, the relative course angle $\theta = \psi - \psi_p$ is introduced, where $\psi_p$ is the orientation of the path at the projection point P. The vehicle kinematics can be described by:

$$\dot{s} = \frac{v\cos(\theta)}{1 - \kappa r} \quad s(0) = s_0$$
$$\dot{r} = v\sin(\theta) \quad r(0) = r_0$$
$$\dot{\theta} = \omega - \frac{v\kappa\cos(\theta)}{1 - \kappa r} \quad \theta(0) = \theta_0$$

where s is traveled distance, v is the vehicle's longitudinal speed, ω is yaw rate, r is the vehicle's lateral offset from the reference path, θ is heading offset, and κ is the curvature of the reference path at the projection point. The curvature is defined as the derivative of the orientation with respect to the travelled distance along the path and may be interpreted as the reciprocal of the local curve radius.

The first differential equation above describes how fast the vehicle moves along the reference path. The equation is derived by first taking the fraction of the velocity tangent to the path, i.e., v cos(θ), and applying the rule of three. This equation plays a useful role in deriving the dynamics but is usually ignored in lateral motion control. That fact indicates a benefit of using Frenet coordinates in lateral control, namely that the number of relevant differential equations can be reduced.

Figure 5:
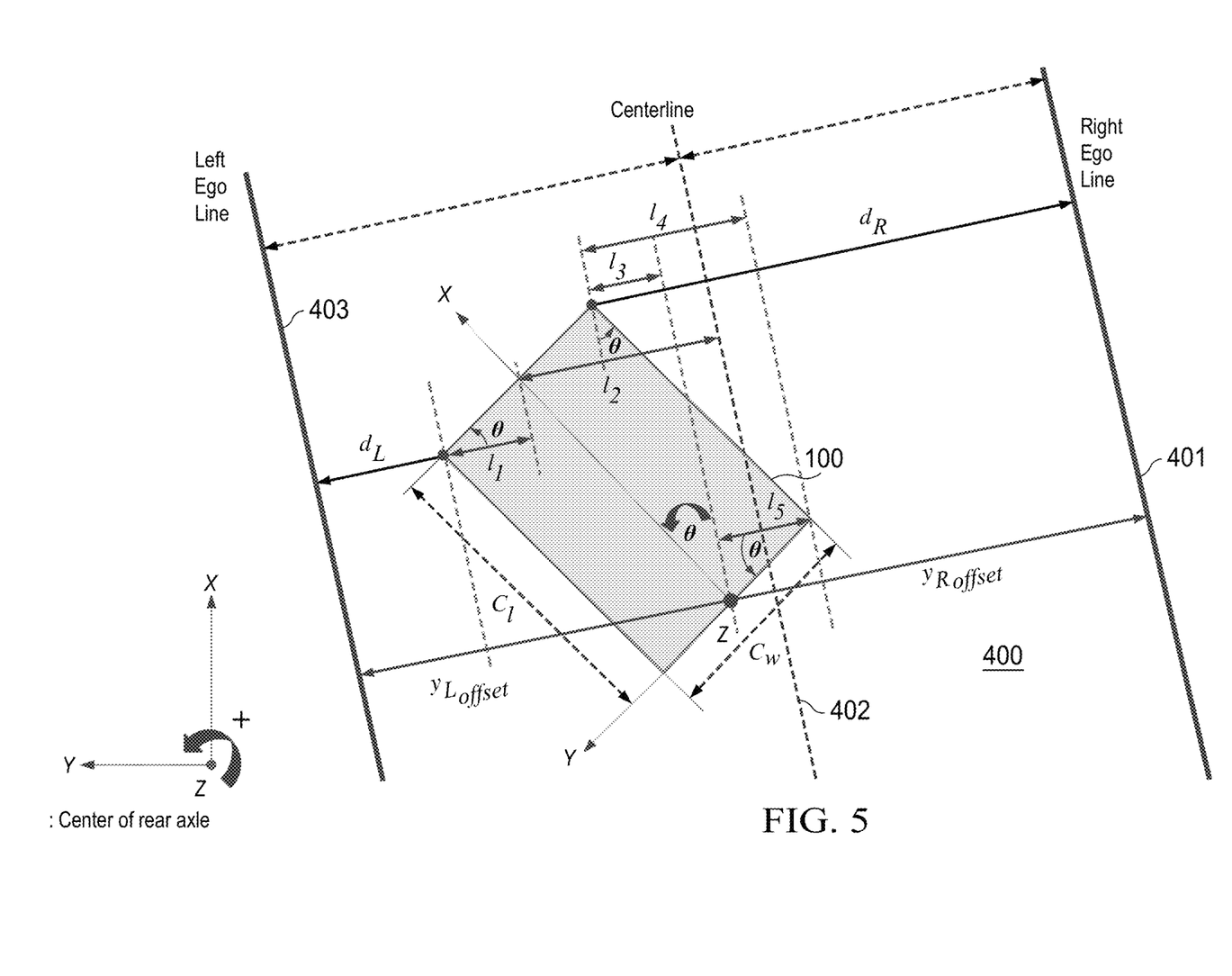
FIGS. 5 and 5A illustrate example parameters to be calculated for lane departure warning in accordance with embodiments of the present disclosure
Figure 5A:
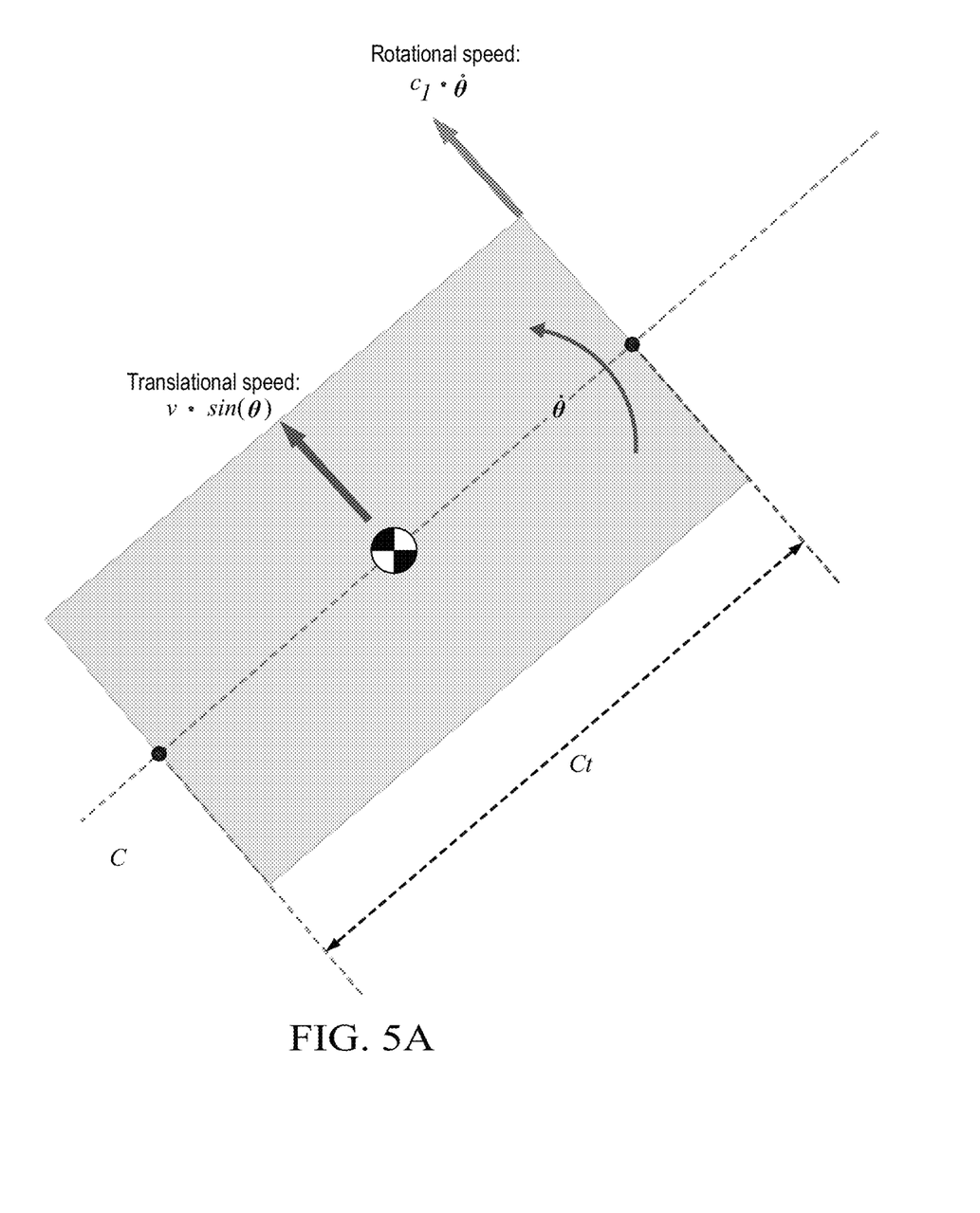

FIGS. 5 and 5A illustrate example parameters to be calculated for lane departure warning in accordance with embodiments of the present disclosure. In FIG. 5, the vehicle 100 has a different orientation within the lane 400 than in FIG. 4, but otherwise the illustration is representative of the scenario in FIG. 4. The centerline 402 of the lane 400 is equidistant from the right lane boundary 401 and the left lane boundary 403. Curvature of the road segment including the lane 400 is presumed to be negligible for the length of the vehicle 100. The x-axis is along the longitudinal axis of the vehicle 100 (having an angle equal to the heading offset θ relative to the centerline 402), the y-axis is along the lateral direction, and the z-axis is vertical through the center of the rear axle (the reference point C) of the vehicle 100. FIG. is a detail of FIG. 5 illustrating just the rotational and lateral translational speeds of the vehicle 100.

Some parameters, namely lateral distances ($d_L$, $d_R$) from the front corners of the vehicle 100 to the closest lane boundary 403, 401 illustrated by FIG. 5, are calculated with the basic vision information [1,2] of lateral/heading offset and vehicle dimension information of wheel-base, overhang, and width (lengths in meters [m], angles in radians [rad]):

$d_L$: left front wheel distance to the left ego line [m],
$d_R$: right front wheel distance to the right ego line [m],
$c_W$: vehicle width [m],
$c_l$: wheelbase+front overhang [m],
θ: heading offset [rad] and the anti-clockwise direction is positive,
$y_{L_{offset}} \geq 0$: lateral offset to the left lane boundary [m], and
$y_{R_{offset}} \geq 0$: lateral offset to the right lane boundary [m].

See Hillel, Aharon Bar, Ronen Lerner, Dan Levi, and Guy Raz. "Recent progress in road and lane detection: a survey." Machine vision and applications 25, no. 3 (2014): 727-745; Narote, Sandipann P., Pradnya N. Bhujbal, Abbhilasha S. Narote, and Dhiraj M. Dhane. "A review of recent advances in lane detection and departure warning system." Pattern Recognition 73 (2018): 216-234.

The lateral distances $d_L$, $d_R$ to each lane boundary 403, 401 can be calculated as:

$$d_L = y_{L_{offset}} - (l_1 + l_2) \geq 0, \text{ with } l_1 = \frac{c_w}{2}\cos(\theta) \text{ and } l_2 = c_l\sin(\theta),$$

such that $$d_L = y_{L_{offset}} - c_l\sin(\theta) - \frac{c_w}{2}\cos(\theta),$$

$$d_R = y_{R_{offset}} + l_3 \geq 0, \text{ with } l_3 = l_4 - l_5 \text{ and}$$

$$l_4 = c_l\sin(\theta), l_5 = \frac{c_w}{2}\cos(\theta), \text{ such that}$$

$$d_R = y_{R_{offset}} + c_l\sin(\theta) - \frac{c_w}{2}\cos(\theta)$$

Another parameter, namely rate of departure ($V_{depart}$) illustrated by FIG. 5A, can be calculated with two different pieces of information: one from the vision information, heading offset (θ); the other from the nonlinear kinematics, rate of curvature ($\dot{\theta}$), which includes both vision information of road curvature K and vehicle motion information (v,ω) in the full nonlinear kinematics:

$$\dot{\theta} = \omega - \frac{v\kappa\cos(\theta)}{1 - \kappa r}.$$

where r is the lateral offset of the vehicle to a lane boundary along the vehicle heading. The rate of departure of the vehicle 100 can be calculated as:

$$V_{depart} = v \cdot \sin(\theta) + c_l \dot{\theta},$$

where $V_{depart}$ is defined at the center of the front edge of the vehicle 100 so that both the translational and rotational components of the rate of departure can be considered. The first term, $v \cdot \sin(\theta)$, indicates the effect of the translational departure rate on a road segment with a large radius of curvature. The second term, $c_l \cdot \dot{\theta}$, denotes the rotational departure rate effects from both yaw motion and the rate of curvature of a road segment with a small radius of curvature. Accordingly, the rate of departure $V_{depart}$ can be captured more precisely for road segments across a larger range of radii of curvature.

Finally, the time to line crossing (TTLC) can be expressed with the two parameters discussed above:

$$\text{If } d_L < d_R, TTLC = \frac{d_L}{V_{depart}},$$

$$\text{else } d_L > d_R, TTLC = \frac{d_R}{V_{depart}}.$$

Note that when $V_{depart} \approx 0$, the value may be saturated to protect TTLC from being diverged.

Figure 6:
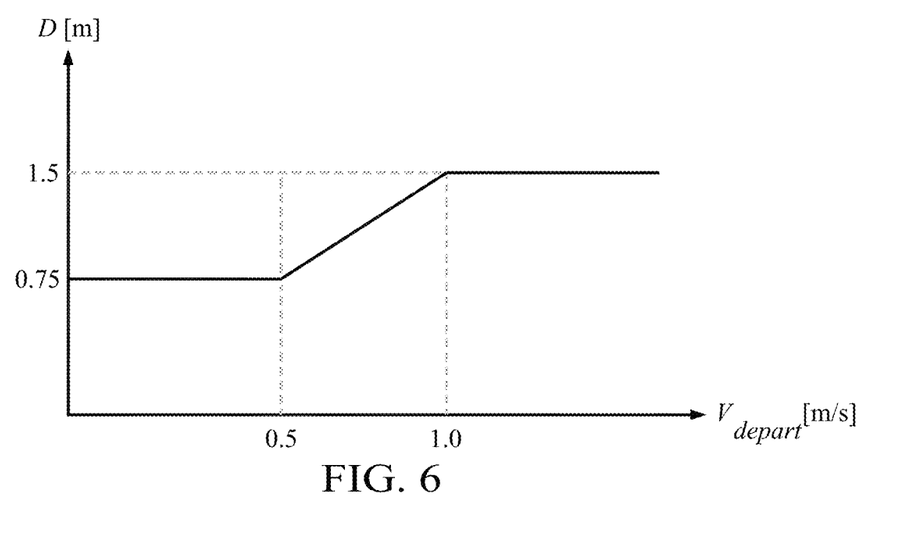
FIG. 6 illustrates an example of thresholding for time to line crossing in activation of a lane departure warning indicator.

A lane departure warning bit LDW can be set or cleared based on a combination of the example parameters discussed above: lateral distances $d_L$, $d_R$ and the rate of departure $V_{depart}$, together with the road curvature κ (the derivative of the path orientation with respect to distance, θ, is interpreted as the reciprocal of the local curve radius as discussed above). One way to do this is to use TTLC with a fixed threshold: LDW=1(on) if TTLC<$TTLC_{threshold}$. Another way to do this is to take advantage of the speed-dependent LDW defined by International Standards Organization within ISO 17361:2017 depicted in FIG. 6, extended to three variables by adding road curvature index in the new axis:

LDW=function($D_{threshold}$, $V_{threshold}$, $\kappa_{threshold}$), where $D_{threshold}$ is a threshold for distance of the vehicle from a lane boundary being approached, $V_{threshold}$ is a threshold for vehicle speed, and $\kappa_{threshold}$ is a threshold for road curvature.

Figure 7:
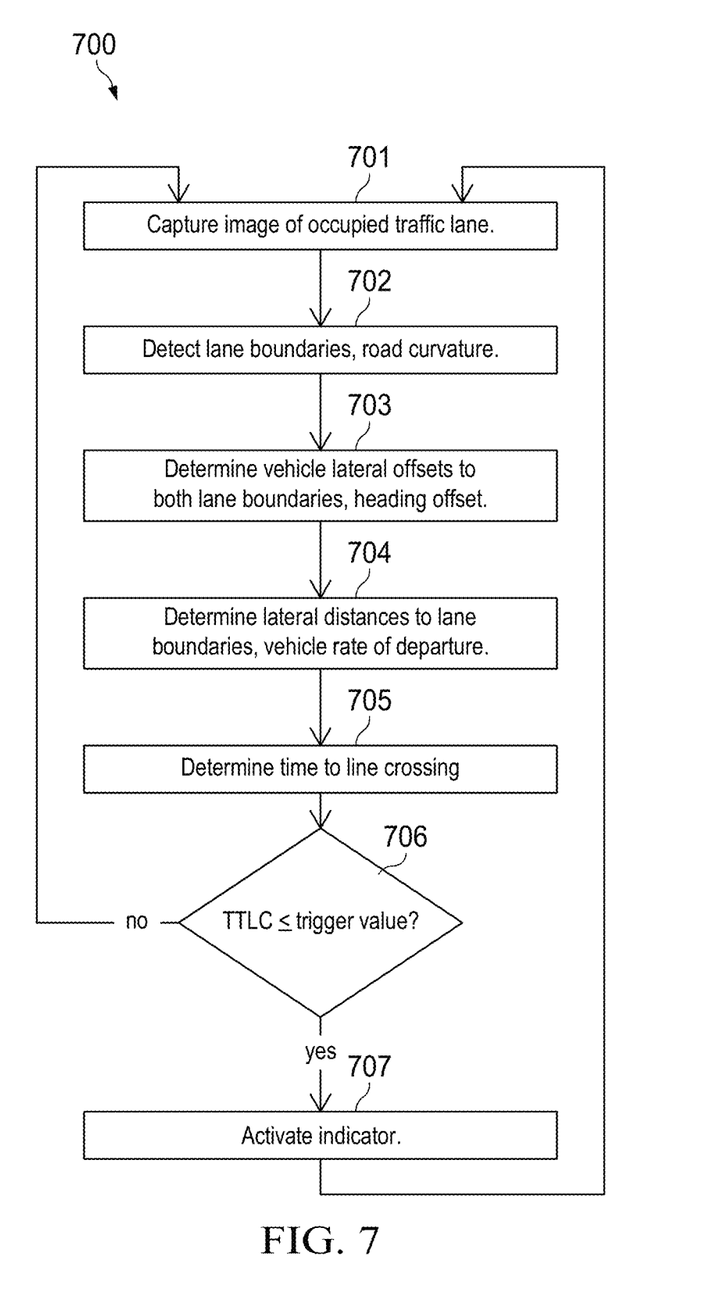
FIG. 7 illustrates a high level flow diagram for a process of improved lane departure warning in accordance with embodiments of the present disclosure.

FIG. 7 illustrates a high level flow diagram for a process 700 of improved lane departure warning in accordance with embodiments of the present disclosure. The embodiment of the process 700 illustrated in FIG. 7 is for illustration and explanation only. FIG. 7 does not limit the scope of this disclosure to any particular implementation. In some embodiments, the process 700 in FIG. 7 may be implemented using, or by connection to, the front camera 106 and the side cameras 107 in FIG. 1 and the IPM CAN 211, front camera ECU 216, and side camera ECU 217 in FIG. 2. The process 700 may be implemented using the functions depicted in FIG. 3 and processing in connection with the scenario of FIG. 4 according to the parameters illustrates by FIG. 5.

The example process 700 illustrated in FIG. 7 includes capturing at least one image of a traffic lane occupied by a vehicle using at least one camera mounted on the vehicle (step 701). The left and right lane boundaries and the road curvature κ are determined from the captured image and one or more previously-captured images (step 702). The vehicle's lateral offsets $y_{L_{offset}}$, $y_{R_{offset}}$ from each lane boundary (e.g., based on vehicle lateral offset r from a reference path for the lane, such as the lane centerline), the vehicle heading offset θ from the path curvature (road curvature κ), and optionally the vehicle yaw rate ω and the vehicle speed v are determined (step 703) using any suitable techniques from the captured image(s) and/or other sensor data.

A control (e.g., behavior prediction 302) used to determine lane departure is used to determine lateral distances $d_L$, $d_R$ of the vehicle from the lane boundaries and the vehicle rate of departure $V_{depart}$ from the lane (step 704), with the calculation of the vehicle's rate of departure being accurate even for a small radius of curvature. Time to line crossing TTLC is determined from the lateral distances $d_L$, $d_R$, accurate vehicle rate of departure $V_{depart}$, and road curvature κ (step 705). Based on the time to line crossing, a check is made whether vehicle lane departure is imminent (determined, for example, by fixed or variable thresholding of TTLC) (step 706). If not, another iteration of the process is started. If so, the process activates visible, audible, and/or haptic warning indicator(s) (step 707), and another iteration of the process is started. The warning indicators may be deactivated when a subsequent iteration of the process determines that vehicle lane departure is no longer imminent. The lane departure warning control signal may also be employed by a collision avoidance control.

The improved lane departure warning of the present disclosure helps predict and warn of the lane departure of the subject vehicle, even during high performance maneuvers. In some cases, this may allow a planning and control module to take control of at least vehicle steering and/or braking for a corrective action.

It may be advantageous to set forth definitions of certain words and phrases used throughout this patent document. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus, comprising:
   at least one camera configured to capture an image of a traffic lane in front of a vehicle; and
   a vehicle behavior prediction controller configured to:
   determine lane boundaries for a segment of a traffic lane occupied by the vehicle from the captured image of the traffic lane in front of the vehicle and prior captured images of the traffic lane in front of the vehicle,
   determine a rate of road curvature for the segment of the traffic lane occupied by the vehicle from the captured image of the traffic lane in front of the vehicle and prior captured images of the traffic lane in front of the vehicle,
   determine lateral distances of the vehicle from the lane boundaries and a rate of departure of the vehicle from the occupied traffic lane that is accurate for the determined road curvature,
   determine a time to line crossing for the vehicle from the lateral distances and the rate of departure, and
   activate a lane departure warning indicator based on the determined time to line crossing.

2. The apparatus according to claim 1, wherein the vehicle behavior prediction controller is configured to determine the rate of departure using first and second terms for effect of road curvature on lane departure for different radii of curvature.

3. The apparatus according to claim 2, wherein the vehicle behavior prediction controller is configured to determine the rate of departure $V_{depart}$ from:

$$V_{depart} = v \cdot \sin(\theta) + c_l \dot{\theta},$$

where v is a speed of the vehicle, θ is a heading offset for the vehicle, $\dot{\theta}$ is a first derivative of θ with respect to traveled distance, $c_l$ is a length of the vehicle, $v \cdot \sin(\theta)$ represents effect of road curvature on lane departure for a first range of radii of curvature, and $c_l \dot{\theta}$ represents effect of road curvature on lane departure for a second range of radii of curvature.

4. The apparatus according to claim 3, wherein the vehicle behavior prediction controller is configured to determine $\dot{\theta}$ from:

$$\dot{\theta} = \omega - \frac{v\kappa \cos(\theta)}{1 - \kappa r},$$

where ω is vehicle yaw rate, κ is the road curvature, and r is a lateral offset of the vehicle to a lane boundary.

5. The apparatus according to claim 1, wherein the vehicle behavior prediction controller is configured to activate the lane departure warning indicator based on the lateral distances, the rate of departure, and a road curvature.

6. The apparatus according to claim 5, wherein the vehicle behavior prediction controller is configured to activate the lane departure warning indicator based on:

LDW=function($D_{threshold}$, $V_{threshold}$, $\kappa_{threshold}$), where $D_{threshold}$ is a threshold for distance of the vehicle from a lane boundary being approached, $V_{threshold}$ is a threshold for vehicle speed, and $\kappa_{threshold}$ is a threshold for road curvature.

7. The apparatus according to claim 1, wherein the vehicle behavior prediction controller is configured to determine the time to line crossing TTLC from a lateral distance $d_L$, to a left lane boundary, a lateral distance $d_R$ to a right lane boundary, and the rate of departure $V_{depart}$ based on:

$$\text{if } d_L < d_R, TTLC = \frac{d_L}{V_{depart}},$$

$$\text{else } d_L > d_R, TTLC = \frac{d_R}{V_{depart}}.$$

8. The apparatus according to claim 1, further comprising:
a vehicle motion controller configured to activate at least one of a braking control and a steering control based on the lane departure warning indicator.

9. A vehicle comprising the apparatus according to claim 1, the vehicle further comprising:
a motor configured to drive wheels of the vehicle;
a chassis supporting axles on which the wheels are mounted;
a steering control configured to generate a steering command to control the wheels based on activation of the lane departure warning indicator;
a brake actuator configured to actuate brakes for one or more of the wheels; and
a braking control configured to generate a braking command to control the brake actuator based on activation of the lane departure warning indicator.

10. The vehicle according to claim 9, wherein the vehicle is an electric vehicle and the motor is an electric motor.

11. A method, comprising:
capturing an image of a traffic lane in front of a vehicle using at least one camera;
determining lane boundaries for a segment of a traffic lane occupied by the vehicle from the captured image of the traffic lane in front of the vehicle and prior captured images of the traffic lane in front of the vehicle;
determining a rate of road curvature for the segment of the traffic lane occupied by the vehicle from the captured image of the traffic lane in front of the vehicle and prior captured images of the traffic lane in front of the vehicle;
determining lateral distances of the vehicle from the lane boundaries and a rate of departure of the vehicle from the occupied traffic lane that is accurate for the determined road curvature;
determining a time to line crossing for the vehicle from the lateral distances and the rate of departure; and
activating a lane departure warning indicator based on the determined time to line crossing.

12. The method according to claim 11, further comprising:
determining the rate of departure using first and second terms for effect of road curvature on lane departure for different radii of curvature.

13. The method according to claim 12, further comprising:
determine the rate of departure $V_{depart}$ from:

$$V_{depart} = v \cdot \sin(\theta) + c_l \cdot \dot{\theta},$$

where v is a speed of the vehicle, $\theta$ is a heading offset for the vehicle, $\dot{\theta}$ is a first derivative of $\theta$ with respect to traveled distance, $c_l$ is a length of the vehicle, $v \cdot \sin(\theta)$ represents effect of road curvature on lane departure for a first range of radii of curvature, and $c_l \cdot \dot{\theta}$ represents effect of road curvature on lane departure for a second range of radii of curvature.

14. The method according to claim 13, further comprising:
determining $\dot{\theta}$ from:

$$\dot{\theta} = \omega - \frac{v\kappa \cos(\theta)}{1 - \kappa r},$$

where $\omega$ is vehicle yaw rate, $\kappa$ is the road curvature, and r is a lateral offset of the vehicle to a lane boundary.

15. The method according to claim 11, further comprising:
activating the lane departure warning indicator based on the lateral distances, the rate of departure, and a road curvature.

16. The method according to claim 15, further comprising:
activating the lane departure warning indicator based on:

LDW=function($D_{threshold}$, $V_{threshold}$, $\kappa_{threshold}$), where $D_{threshold}$ is a threshold for distance of the vehicle from a lane boundary being approached, $V_{threshold}$ is a threshold for vehicle speed, and $\kappa_{threshold}$ is a threshold for road curvature.

17. The method according to claim 11, further comprising:
determining the time to line crossing TTLC from a lateral distance $d_L$ to a left lane boundary, a lateral distance $d_R$ to a right lane boundary, and the rate of departure $V_{depart}$ based on:

$$\text{if } d_L < d_R, TTLC = \frac{d_L}{V_{depart}},$$

$$\text{else } d_L > d_R, TTLC = \frac{d_R}{V_{depart}}.$$

18. The method according to claim 11, further comprising:
activating at least one of a braking control and a steering control based on the lane departure warning indicator.

19. The method according to claim 11, further comprising:
driving wheels of the vehicle with a motor;
supporting axles on which the wheels are mounted with a chassis;
generating a steering command to control the wheels based on activation of the lane departure warning indicator; and
actuating brakes for one or more of the wheels based on activation of the lane departure warning indicator.

20. The method according to claim 19, wherein the vehicle is an electric vehicle and the motor is an electric motor.

* * * * *